(12) United States Patent
Kasahara et al.

(10) Patent No.: US 8,236,213 B2
(45) Date of Patent: *Aug. 7, 2012

(54) PROCESS FOR PRODUCING PERFLUOROPOLYMER, PRODUCTION APPARATUS AND PROCESS FOR PRODUCING ELECTROLYTE MEMBRANE FOR POLYMER ELECTROLYTE FUEL CELLS

(75) Inventors: Nobuyuki Kasahara, Chiyoda-ku (JP);
Noriaki Miyaki, Chiyoda-ku (JP);
Fusaaki Takeo, Chiyoda-ku (JP);
Satoshi Shiratori, Chiyoda-ku (JP)

(73) Assignee: Asahi Glass Company, Limited, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 12/121,095

(22) Filed: May 15, 2008

(65) Prior Publication Data

US 2008/0287609 A1 Nov. 20, 2008

(30) Foreign Application Priority Data

May 16, 2007 (JP) .................. 2007-130350

(51) Int. Cl.
*B27N 3/08* (2006.01)
*C08F 14/18* (2006.01)
(52) U.S. Cl. .......... 264/83; 526/243; 526/250; 526/255; 429/314; 429/316; 528/401; 528/481; 528/483
(58) Field of Classification Search .................. 526/250, 526/243; 429/314, 316; 528/401
See application file for complete search history.

(56) References Cited

U.S. PATENT DOCUMENTS

| | | | | | |
|---|---|---|---|---|---|
| 3,379,811 | A | * | 4/1968 | Hartmann et al. | 264/555 |
| 3,718,627 | A | * | 2/1973 | Grot | 526/240 |
| 3,988,491 | A | * | 10/1976 | Dixon et al. | 442/164 |
| 4,295,809 | A | * | 10/1981 | Mikami et al. | 425/72.2 |
| 4,296,151 | A | * | 10/1981 | Boultinghouse | 427/322 |
| 4,626,587 | A | * | 12/1986 | Morgan et al. | 528/481 |
| 4,743,658 | A | * | 5/1988 | Imbalzano et al. | 525/326.4 |
| 4,916,020 | A | * | 4/1990 | Golding et al. | 428/421 |
| 5,632,938 | A | * | 5/1997 | Buehning, Sr. | 264/39 |

(Continued)

FOREIGN PATENT DOCUMENTS

JP 63212904 A * 9/1988

(Continued)

OTHER PUBLICATIONS

Machine translation of JP 2007-145005 A.*
Office Action issued on Nov. 22, 2011 in the corresponding Japanese Patent Application No. 2006-288661 (with English Translation).

*Primary Examiner* — Mark Eashoo
*Assistant Examiner* — Nicole M Buie-Hatcher
(74) *Attorney, Agent, or Firm* — Oblon, Spivak, McClelland, Maier & Neustadt, L.L.P.

(57) ABSTRACT

A process for producing a perfluoropolymer, the process including extruding a polymer obtained by polymerizing a perfluoromonomer to prepare strands, and bringing a gas comprising from 3 to 50 volume % of fluorine gas into contact with the strands; the process being conducted on an apparatus that includes an extruder for melting and extruding the polymer obtained by polymerizing a perfluoromonomer, a die having a plurality of pores for preparing the strands from the molten polymer extruded, and a fluorination tank for bringing the gas comprising from 3 to 50 volume % of fluorine gas into contact with the strands.

20 Claims, 4 Drawing Sheets

U.S. PATENT DOCUMENTS

| | | | | |
|---|---|---|---|---|
| 5,886,090 | A * | 3/1999 | Yamana et al. | 524/546 |
| 6,610,789 | B2 * | 8/2003 | Watakabe et al. | 525/276 |
| 6,838,545 | B2 | 1/2005 | Chapman et al. | |
| 7,488,788 | B2 * | 2/2009 | Kasahara et al. | 526/247 |
| 2005/0145353 | A1 * | 7/2005 | Troxell et al. | 162/118 |
| 2006/0063903 | A1 | 3/2006 | Kasahara et al. | |

FOREIGN PATENT DOCUMENTS

| | | |
|---|---|---|
| JP | 11-116710 | 4/1999 |
| JP | 2007-145005 | 6/2007 |
| WO | WO 2004/102714 A1 | 11/2004 |
| WO | 2008/143069 | 11/2008 |

* cited by examiner

PROCESS FOR PRODUCING PERFLUOROPOLYMER, PRODUCTION APPARATUS AND PROCESS FOR PRODUCING ELECTROLYTE MEMBRANE FOR POLYMER ELECTROLYTE FUEL CELLS

BACKGROUND OF THE INVENTION

1. Field of the Invention

The present invention relates to a process for producing a perfluoropolymer, a production apparatus and a process for producing an electrolyte membrane for polymer electrolyte fuel cells.

2. Discussion of Background

A perfluoropolymer is used in various fields such as coating of e.g. a chemical plant or a semiconductor production apparatus; covering of a cable or an optical fiber; and automobile components. Recently, a perfluoropolymer having —SO$_3$H groups has attracted attention as a prospective material for an electrolyte membrane for polymer electrolyte fuel cells.

However, immediately after obtained by polymerizing a perfluoromonomer such as perfluorocarbon, a perfluoropolymer is not completely perfluorinated, and at some of its molecular chain terminals, it has unstable functional groups (hereinafter, referred to as unstable terminal groups) such as a —COOH group, a —CF=CF$_2$ group, a —COF group and a —CF$_2$H group. Accordingly, if a perfluoropolymer is used as en electrolyte for fuel cells for a long time, there is a problem that the perfluoropolymer is gradually decomposed by the presence of the unstable terminal groups, whereby the power generation voltage deteriorates. Further, there is a problem that the mechanical strength of the electrolyte membrane deteriorates as the perfluoropolymer is decomposed, and e.g. pinholes, cracks or delamination results, whereby it becomes impossible to use the fuel cell.

As a process for producing a perfluoropolymer having unstable terminal groups reduced, the following method has been proposed.

A method of introducing a 2 mm-thick sheet made of a copolymer of tetrafluoroethylene and CF$_2$=CFOCF$_2$CF(CF$_3$)O(CF$_2$)$_2$SO$_2$F into an autoclove reactor and fluorinating it at 190° C. for 4 hours (Patent Document 1).

However, such a method has the following problems:

(i) It takes a few hours to raise and lower the temperature of the autoclove reactor.

(ii) It takes a few hours to fluorinate the sheet to its center since it is thick.

(iii) Even if the sheet is made thin so as to shorten the time for fluorination, the amount of a perfluoropolymer which can be produced per treatment decreases.

(iv) In order to take out the perfluoropolymer from the autoclove reactor, it is necessary to carry out degasification of fluorine gas completely, but it takes a long time (about one day) to replace the interior of the autoclove reactor with nitrogen gas.

(v) Since a batch system is employed in the method, it is impossible to carry out fluorination treatment continuously.

In view of the problems of (i) to (v), the method as described in Patent Document 1 has a problem that it is impossible to efficiently produce a perfluoropolymer having unstable terminal groups reduced.

Patent Document 1: WO2004/102714 (EXAMPLE 1 on page 9)

SUMMARY OF THE INVENTION

It is an object of the present invention to provide a process for efficiently producing a perfluoropolymer having unstable terminal groups reduced, a production apparatus, and a process for efficiently producing an electrolyte membrane for polymer electrolyte fuel cells excellent in the durability.

The process for producing a perfluoropolymer of the present invention comprises extruding a polymer obtained by polymerizing a perfluoromonomer to prepare strands, and bringing gas containing from 3 to 50 volume % of fluorine gas into contact with the strands.

In the process for producing a perfluoropolymer of the present invention, it is preferred that the gas containing fluorine gas is brought into contact with the strands at a temperature of from 150 to 350° C.

It is preferred that the polymer has —SO$_2$F groups.

It is preferred that the polymer is a copolymer of tetrafluoroethylene and a compound represented by the following formula (1):

$$CF_2=CF(OCF_2CFX)_p(O)_q(CF_2)_nSO_2F \qquad (1)$$

wherein X is a fluorine atom or a trifluoromethyl group, p is an integer of from 0 to 8, q is 0 or 1, n is an integer of from 0 to 8, and p+n>0.

In the process for producing a perfluoropolymer of the present invention, it is preferred that the polymer obtained by polymerizing a perfluoromonomer is extruded by a melt extrusion process, and a molten polymer extruded is passed through a die having a plurality of pores to prepare strands.

The apparatus for producing a perfluoropolymer of the present invention, comprises an extruder for melting and extruding a polymer obtained by polymerizing a perfluoromonomer, a die having a plurality of pores for preparing strands from the molten polymer extruded, and a fluorination tank for bringing gas containing from 3 to 50 volume % of fluorine gas into contact with the strands.

The process for producing an electrolyte membrane for polymer electrolyte fuel cells of the present invention, comprises forming a perfluoropolymer having —SO$_2$F groups into a film; and subjecting the film to hydrolysis treatment and treatment for acidification.

The process for producing an electrolyte membrane for polymer electrolyte fuel cells of the present invention, comprises subjecting a perfluoropolymer having —SO$_2$F groups, obtained in the process for producing a perfluoropolymer of the present invention, to hydrolysis treatment and treatment for acidification; and forming a treated perfluoropolymer into a film.

According to the process for producing a perfluoropolymer of the present invention, it is possible to efficiently produce a perfluoropolymer having unstabilized terminal groups reduced.

According to the apparatus for producing a perfluoropolymer of the present invention, it is possible to efficiently produce a perfluoropolymer having unstabilized terminal groups reduced.

According to the process for producing an electrolyte membrane for polymer electrolyte fuel cells of the present invention, it is possible to efficiently produce an electrolyte membrane for polymer electrolyte fuel cells excellent in the durability.

MEANINGS OF SYMBOLS

1: Strands
10: Apparatus for producing a perfluoropolymer
11: Extruder
12: Die
13: Fluorination tank
20: Apparatus for producing a perfluoropolymer
30: Apparatus for producing a perfluoropolymer
40: Apparatus for producing a perfluoropolymer

DETAILED DESCRIPTION OF THE PREFERRED EMBODIMENTS

In the present specification, a compound represented by the formula (1) will be referred to as a compound (1). The same applies to compounds represented by other formulae.

First Embodiment

Apparatus for Producing Perfluoropolymer

Figure 1:
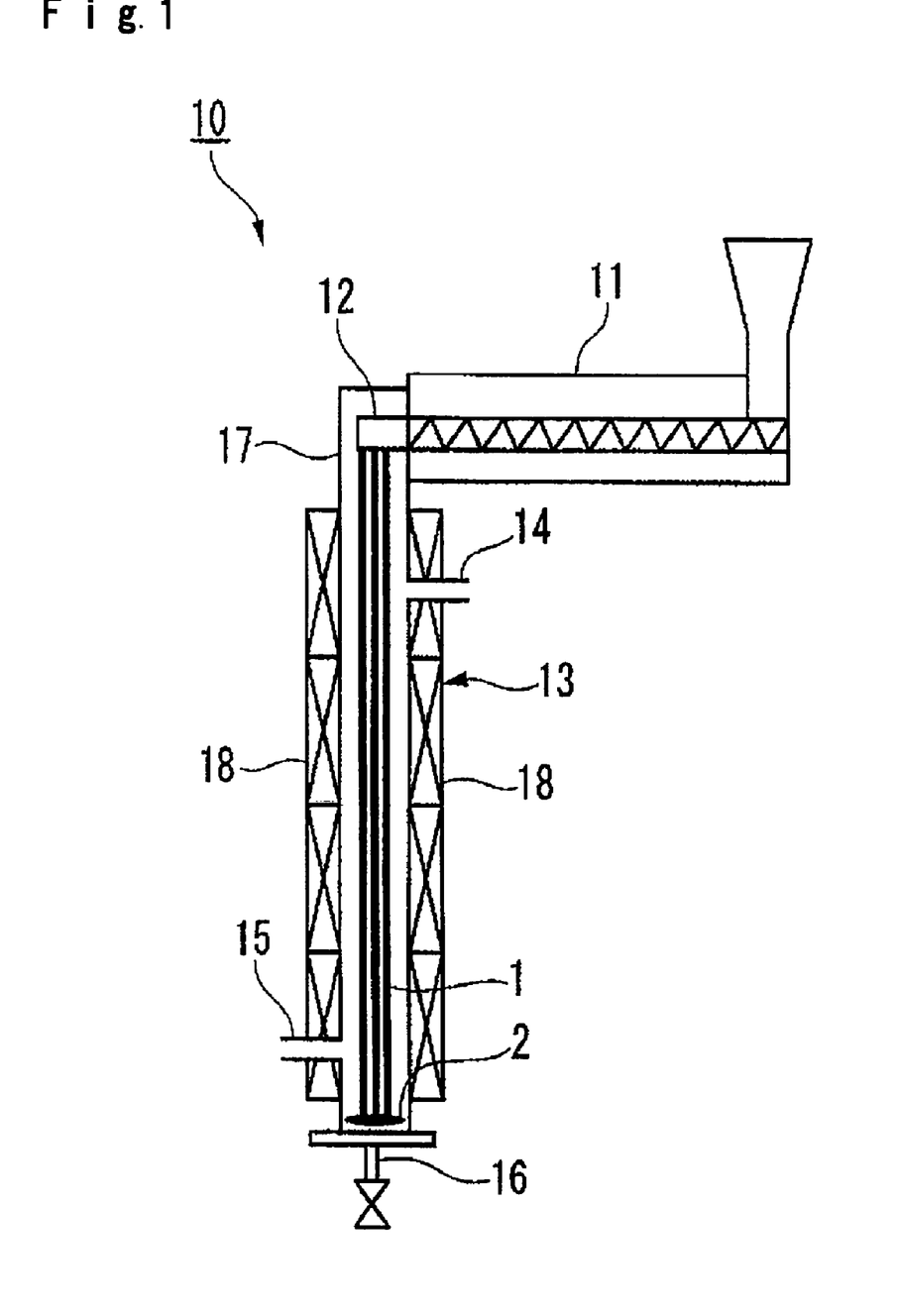
FIG. 1 is a schematic view showing one embodiment of the apparatus for producing a perfluoropolymer of the present invention.

FIG. 1 is a schematic view showing one embodiment of the apparatus for producing a perfluoropolymer of the present invention. An apparatus 10 for producing a perfluoropolymer is one having an extruder 11 for melting and extruding a polymer, a die 12 having a plurality of pores, which is attached to the forward end of the extruder 11, and a fluorination tank 13 having the die 12 attached to its head portion.

The extruder 11 may, for example, be a single screw extruder, a twin screw extruder, a conical feeder or a gear pump, but is preferably a single screw extruder from such a viewpoint that it is possible to stably extrude a molten polymer. FIG. 1 is an embodiment using a single screw extruder.

The diameter of pores in the die 12 is preferably from 0.5 to 5 mm, particularly preferably from 1 to 3 mm. When the pore diameter is at least 0.5 mm, strands will not easily break. When the pore diameter is at most 5 mm, strands will not be too thick, and the diffusion distance of fluorine gas will be sufficiently short, whereby it will be possible to fluorinate unstable terminal groups sufficiently.

As the number of pores in the die 12 increases, it is possible to more efficiently produce the perfluoropolymer. Even when the amount for treatment is the same, it is possible to efficiently carry out treatment by reducing the diameter of the strands by increasing the number of strands rather than increasing the diameter of pores in the die 12. The number of pores in the die may be suitably set depending on e.g. the inner diameter of the fluorination tank 13.

The fluorination tank 13 is one composed of a vertical cylinder 17 having a top portion to attach the die 12 at its head portion, a gas inlet 14 and a gas outlet 15 at its side and a polymer-withdrawing outlet 16 at its bottom, and a heater 18 attached on the circumference of the cylinder 17. The material for the cylinder is preferably nickel. Further, in FIG. 1, the gas inlet 14 is positioned at an upper portion of the fluorination tank 13 and the gas outlet 15 is positioned at a lower portion thereof, but such positions may be reversed. Namely, the gas inlet 14 may be positioned at a lower portion and the gas outlet 15 may be positioned at an upper portion of the fluorination tank 13.

Process for Producing Perfluoropolymer

The production of a perfluoropolymer using the apparatus 10 for producing a perfluoropolymer is carried out as follows:

(i) One or more perfluoromonomers are polymerized to obtain a polymer.

(ii) The obtained polymer is melted by the extruder 11 and extruded into the die 12.

(iii) The molten polymer extruded is passed through the die 12 to form strands 1.

(iv) Gas containing fluorine gas is brought in contact with strands 1 while the strands 1 are permitted to descend in the fluorination tank 13.

(v) The perfluoropolymer 2 pooled at the bottom of the fluorination tank 13 is taken out from the polymer withdrawing outlet 16.

As shown in FIG. 1, the steps (ii) to (v) are continuously carried out by the apparatus 10 for producing a perfluoropolymer, having the extruder 11, the die 12 and the fluorination tank 13 integrally connected in series for carrying out the respective steps.

The perfluoromonomer may, for example, be a perfluorovinyl compound having —$SO_2F$ groups, a perfluoroolefin or a perfluoro(alkyl vinyl ether).

The perfluoro vinyl compound having —$SO_2F$ groups may, for example, be a compound (1):

$$CF_2=CF(OCF_2CFX)_p(O)_q(CF_2)_nSO_2F \quad (1)$$

wherein X is a fluorine atom or a polyfluoromethyl group, p is an integer of from 0 to 8, q is 0 or 1, n is an integer of from 0 to 8, and p+n>0.

The compound (1) may be compounds (1-1) to (1-4).

$$CF_2=CFO(CF_2)_rSO_2F \quad (1-1)$$

$$CF_2=CFOCF_2CF(CF_3)O(CF_2)_sSO_2F \quad (1-2)$$

$$CF_2=CF(CF_2)_tSO_2F \quad (1-3)$$

$$CF_2=CF[OCF_2CF(CF_3)]_zO(CF_2)_2SO_2F \quad (1-4)$$

wherein r is an integer of from 1 to 9, s is an integer of from 1 to 8, t is an integer of from 0 to 8, and z is 2 or 3.

The perfluoroolefin may, for example, be tetrafluoroethylene or hexafluoropropylene.

The perfluoro(alkyl vinyl ether) may, for example, be a compound (2):

$$CF_2=CF(OCF_2CFY)_yOR^f \quad (2)$$

wherein Y is a fluorine atom or a trifluoromethyl group, y is an integer of from 0 to 3, and $R^f$ is a perfluoroalkyl group.

The compound (2) may be compounds (2-1) to (2-3).

$$CF_2=CFO(CF_2)_vCF_3 \quad (2-1)$$

$$CF_2=CFOCF_2CF(CF_3)O(CF_2)_wCF_3 \quad (2-2)$$

$$CF_2=CF[OCF_2CF(CF_3)]_xO(CF_2)_2CF_3 \quad (2-3)$$

wherein v is an integer of from 1 to 8, w is an integer of from 1 to 8, and x is an integer of from 0 to 3.

As a polymer (hereinafter referred to as a polymer) obtained by polymerizing a perfluoromonomer, a copolymer (hereinafter referred to as PFA) of tetrafluoroethylene and a perfluoro(alkyl vinyl ether), a copolymer (hereinafter referred to as FEP) of tetrafluoroethylene and hexafluoropropylene, or a polymer having —$SO_2F$ groups may, for example, be mentioned. A starting material for an electrolyte membrane for polymer electrolyte fuel cells is preferably a polymer having —$SO_2F$ groups, particularly preferably a copolymer (hereinafter referred to as a copolymer (A)) of tetrafluoroethylene and the compound (1). Further, it is also possible to preferably use a copolymer obtained by further adding another perfluoromonomer to tetrafluoroethylene and the compound (1), followed by copolymerizing them.

The melting temperature (the temperature in the extruder 11) of the polymer is preferably from 180 to 240° C. in the case of the copolymer (A), preferably from 330 to 380° C. in the case of PFA, and preferably from 310 to 360° C. in the case of FEP.

The extrusion rate (g/min) of the polymer may suitably be set so that the contact time of strands with gas containing fluorine gas and the strand diameter would be within preferred ranges as mentioned below depending on the number and diameter of pores in the die 12 and the length of the fluorination tank.

In order to increase the efficiency of fluorination, it is preferred to suitably adjust the melt viscosity of the polymer at the temperature of passing through the die 12. In the case of e.g. the copolymer (A), the melt viscosity is preferably from 1,000 to 7,000 Pa·sec. If the melt viscosity is too high, extrusion of the polymer tends to be difficult. If the melt viscosity is too low, strands will rapidly fall down, whereby fluorination of unstable terminal groups tends to be insufficient since the contact time with gas containing fluorine gas will be short.

TQ of the polymer is preferably at least 150° C., more preferably at least 200° C. TQ of the polymer is at most 350° C., more preferably at most 300° C.

A TQ value (unit: ° C.) is an index for the molecular weight of a polymer and is a temperature at which the extrusion amount becomes 100 mm$^3$/sec when melt extrusion of a polymer is carried out under a condition of an extrusion pressure of 2.94 MPa by using a nozzle with a length of 1 mm and an inner diameter of 1 mm.

The temperature (the temperature in a fluorination tank) at the time of bringing gas containing fluorine gas into contact with strands, is preferably from 150 to 350° C.

Specifically, in the case of the copolymer (A), it is more preferably from 150 to 200° C., particularly preferably from 170 to 190° C. When the temperature is at least 150° C., it is possible to sufficiently fluorinate unstable terminal groups. When the temperature is at most 200° C., it is possible to suppress decomposition of —SO$_2$F groups.

In the case of PFA, it is more preferably from 300 to 350° C., and in the case of FEP, it is more preferably from 230 to 300° C.

Fluorine gas is diluted with inert gas such as nitrogen gas and supplied from the gas inlet 14 as mixed gas. The concentration of fluorine gas in the mixed gas is from 3 to 50 vol %. If the concentration of fluorine gas is too low, the reaction efficiency tends to be low, whereby it becomes necessary to increase the contact time of the strands with the fluorine gas, such being undesirable from the viewpoint of production efficiency. It is more preferably at least 5 vol %. Further, if the concentration of fluorine gas is too high, there is a risk of polymer decomposition, whereby it is necessary to provide an equipment for carrying out the contacting safely, such being undesirable from the viewpoint of cost. It is more preferably at most 25 vol %.

The pressure in the fluorination tank 13 is preferably at most 1 MPa (gauge pressure), more preferably from 0 to 0.5 MPa. The pressure in the fluorination tank 13 is kept constant by adjusting the amount of discharge from the gas outlet 15.

The fluorine gas is absorbed and diffused into the polymer strands and it is thereby reacted with unstable terminal groups. Inert gas such as nitrogen gas used as diluent gas is also dissolved in the polymer, but such gas does not hinder the reaction. Further, the inert gas never decreases the efficiency of degasification by presenting in the form of bubbles in the strands. On the other hand, in a case where, for example, the polymer is brought into contact with gas in the extruder or the polymer is brought into contact with gas while exerting shear forces, bubbles tend to be finely dispersed, whereby it takes a long time for degassing treatment.

The strand diameter is preferably from 0.1 to 1 mm, more preferably from 0.1 to 0.3 mm at the thinnest portion (in the vicinity of the bottom of the fluorination tank). When the strand diameter is at least 0.1 mm, the strand does not easily break. When the strand diameter is at most 1 mm, it is possible to sufficiently fluorinate unstable terminal groups.

The contact time of the strands with the gas containing fluorine gas is preferably from 5 to 30 minutes. When the contact time is at least five minutes, it is possible to sufficiently fluorinate unstable terminal groups. There will be no problems even if the contact time exceeds 30 minutes, but it is preferably at most 30 minutes from the viewpoint of treatment is efficiency. The contact time is obtained in such a manner that the linear speed (m/sec) of the die is calculated by dividing the amount for treatment (mL/min) by the total area of pores in the die, followed by dividing the descending distance (the height of the fluorination tank 12) by the linear speed.

Second Embodiment

Apparatus for Producing Perfluoropolymer

Figure 2:
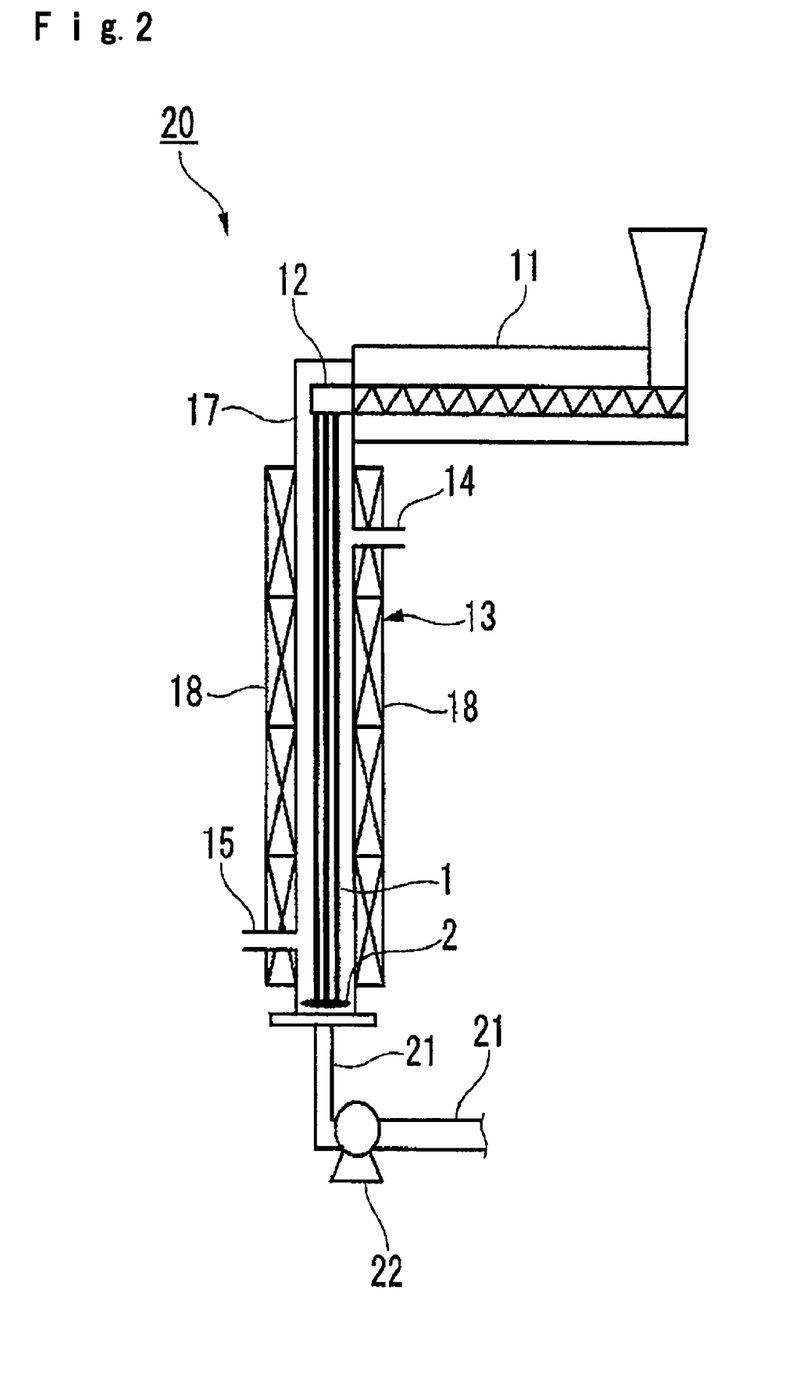
FIG. 2 is a schematic view showing another embodiment of the apparatus for producing a perfluoropolymer of the present invention.

FIG. 2 is a schematic view showing another embodiment of the apparatus for producing a perfluoropolymer of the present invention. An apparatus 20 for producing a perfluoropolymer has an extruder 11 for melting and extruding a polymer, a die 12 having a plurality of pores, attached to the forward end of the extruder 11, a fluorination tank 13 having the die 12 attached to its head portion, a withdrawing pipe 21 connected to a polymer withdrawing outlet of the fluorination tank 13, and a pump 22 provided at a midway point of the withdrawing pipe 21.

As the extruder 11, the die 12 and the fluorination tank 13, the same ones as in the First Embodiment are used.

The interior of the withdrawing pipe 21 is filled with the perfluoropolymer 2, and it is in a state sealed (material sealing) with the perfluoropolymer 2 so that the fluorine gas in the fluorination tank 13 will not be discharged to outside through the withdrawing pipe 21.

The pump 22 may, for example, be a gear pump or a single screw extruder.

Process for Producing Perfluoropolymer

The production of a perfluoropolymer, using the apparatus 20 for producing a perfluoropolymer, is carried out as follows:

(i) to (iv) are carried out in the same manner as in the First Embodiment.

(v) In a state where the withdrawing pipe 21 is sufficiently sealed by material sealing with the perfluoropolymer 2, operation of the pump 22 is started to withdraw the perfluoropolymer 2 continuously from the withdrawing pipe 21.

As shown in FIG. 2, the steps of (ii) to (v) are continuously carried out by the apparatus 20 for producing a perfluoropolymer, having the extruder 11, the die 12, the fluorination tank 13, the withdrawing pipe 21 and the pump 22 integrally connected in series for carrying out the respective steps.

Third Embodiment

Apparatus for Producing Perfluoropolymer

Figure 3:
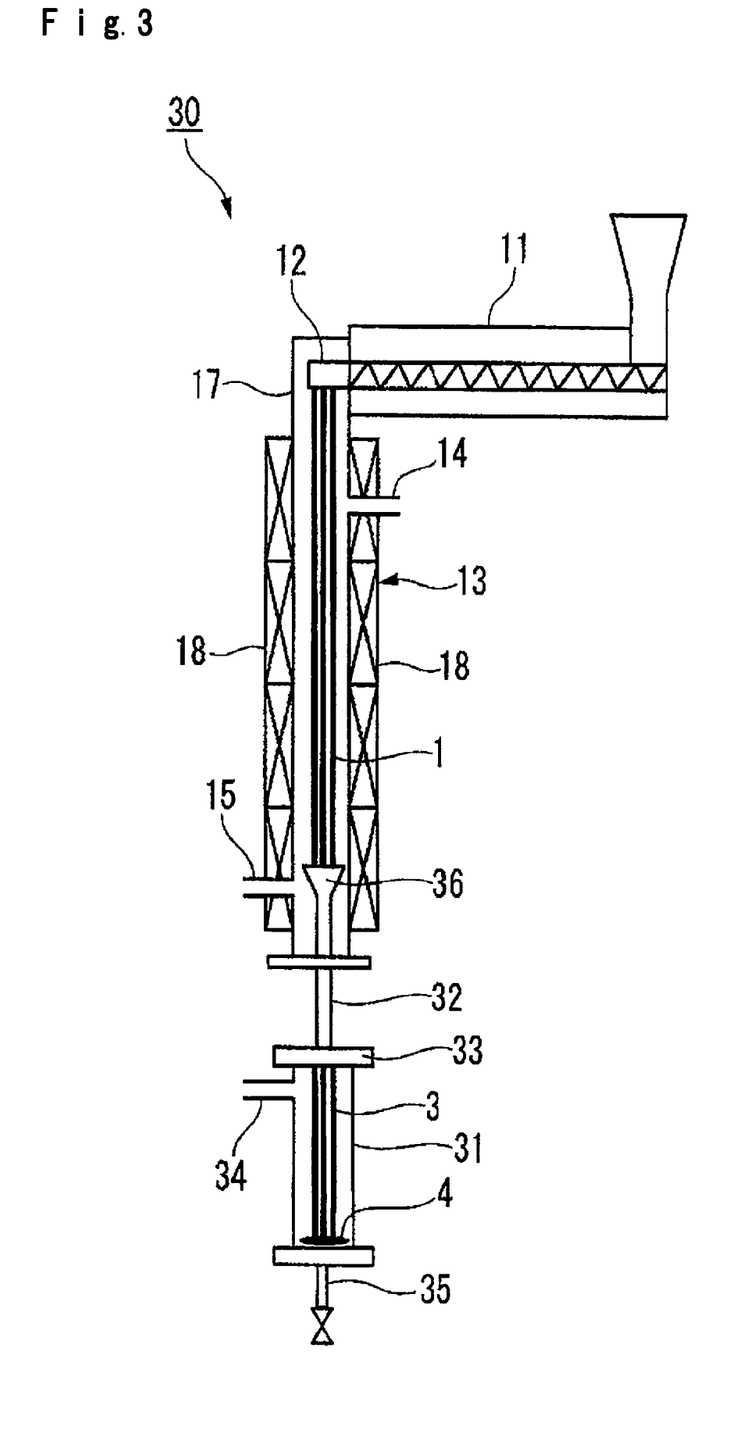
FIG. 3 is a schematic view showing another embodiment of the apparatus for producing a perfluoropolymer of the present invention.

FIG. 3 is a schematic view showing another embodiment of the apparatus for producing a perfluoropolymer of the present invention. An apparatus 30 for producing a perfluoropolymer has an extruder 11 for melting and extruding a polymer, a die 12 having a plurality of pores, attached to the forward end of the extruder 11, a fluorination tank 13 having the die 12 attached to its head portion, a degassing tank 31, and a withdrawing pipe 32 having one end located in the fluorination tank 13 and the other end connected to the degassing tank 31.

As the extruder 11, the die 12 and the fluorination tank 13, the same ones as in the First Embodiment are used.

The degassing tank 31 is one composed of a die 33 having a plurality of pores formed on its head portion, a degassing outlet 34 at its side, and a polymer withdrawing outlet 35 at its bottom.

The withdrawing pipe 32 is a pipe having a polymer receiver 36 formed at one end, and it is in a state sealed (material sealing) with a perfluoropolymer so that the fluorine gas in the fluorination tank 13 would not leak to the degassing tank 31 through the withdrawing pipe 32.

Process for Producing Perfluoropolymer

The production of a perfluoropolymer, using the apparatus 30 for producing a perfluoropolymer, is carried out as follows:

(i) to (iv) are carried out in the same manner as in First Embodiment.

(v) In a state where the withdrawing pipe 32 is sufficiently sealed by material sealing with the perfluoropolymer, degassing by the degassing tank 31 is carried out from the degassing outlet 34. The perfluoropolymer is introduced into the degassing tank 31 by the pressure difference between the fluorination tank 13 and the degassing tank 31.

(vi) The perfluoropolymer is passed through the die 33 to prepare strands 3.

(vii) While the strands 3 are permitted to descend in the degassing tank 31, fluorine gas remained in the strands 3 is removed.

(viii) The perfluoropolymer 4 pooled at the bottom of the degassing tank 31 is withdrawn from the polymer withdrawing outlet 35.

As shown in FIG. 3, the steps of (ii) to (viii) are continuously carried out by the apparatus 30 for producing a perfluoropolymer, having the extruder 11, the die 12, the fluorination tank 13, the withdraw pipe 32 and the degassing tank 31 integrally connected in series for carrying out the respective steps.

The pressure in the degassing tank 31 is preferably set to be lower by from 0.1 to 0.6 MPa (gauge pressure) than the pressure in the fluorination tank 13.

In a case where it is impossible to introduce a perfluoropolymer into the degassing tank 31 by the pressure difference due to high viscosity of the perfluoropolymer, a pump may be provided in the withdrawing pipe 32.

Fourth Embodiment

Apparatus for Producing Perfluoropolymer

Figure 4:
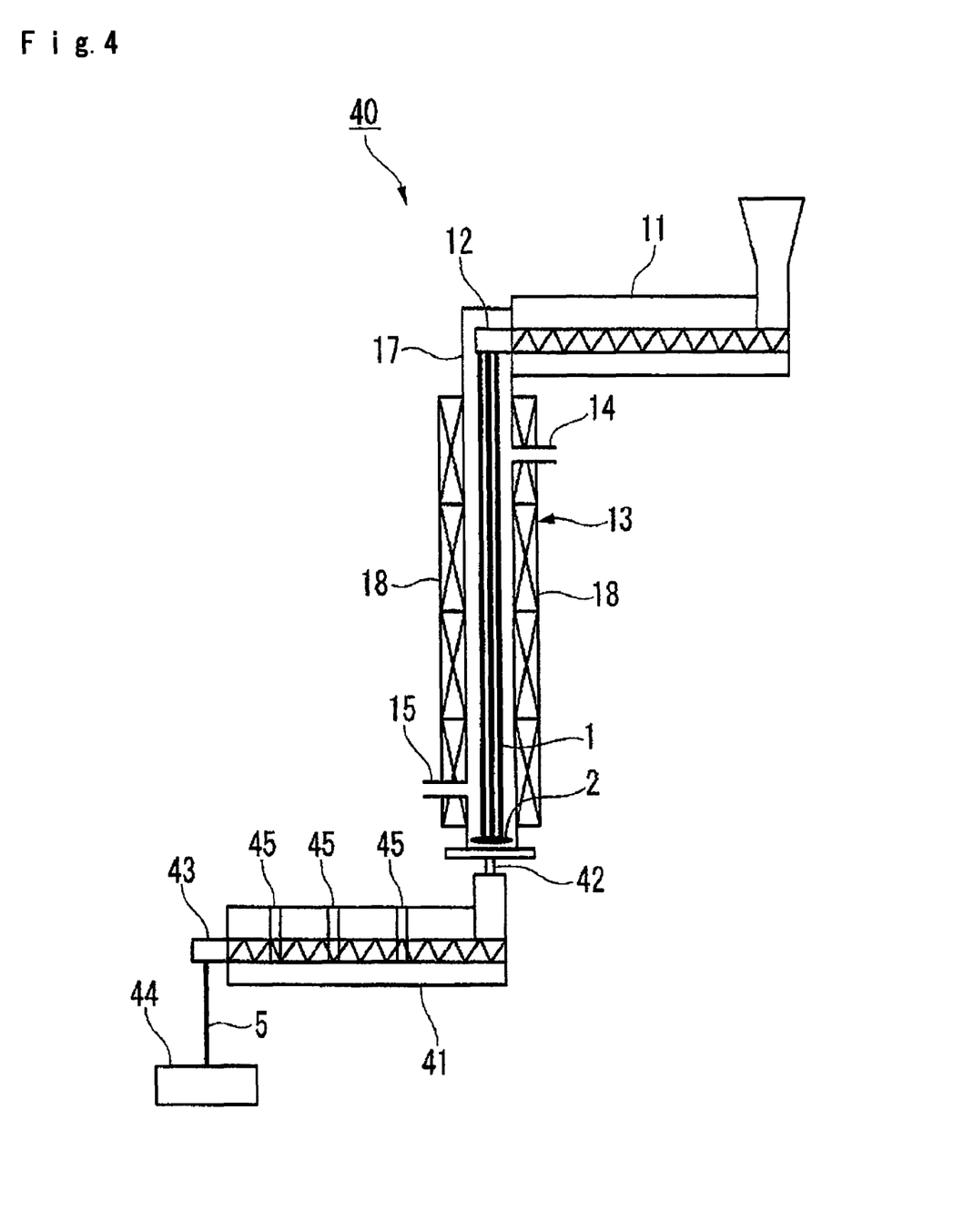
FIG. 4 is a schematic view showing another embodiment of the apparatus for producing a perfluoropolymer of the present invention.

FIG. 4 is a schematic view showing another embodiment of the apparatus for producing a perfluoropolymer of the present invention. An apparatus 40 for producing a perfluoropolymer has a extruder 11 for melting and extruding a polymer, a die 12 having a plurality of pores formed, attached to the forward end of the extruder, a fluorination tank 13 having a die 12 attached to its head portion, a twin screw extruder 41, a withdrawing pipe 42 having one end connected to a polymer withdrawing outlet of the fluorination tank 13 and the other end connected to a polymer inlet of the twin screw extruder 41, a die 43 attached to the forward end of the twin screw extruder 41, and a pelletizer 44.

As the extruder 11, the die 12 and the fluorination tank 13, the same ones as in First Embodiment are used.

The twin screw extruder 41 is one having bent ports 45 which are formed for deaeration of the perfluoropolymer 2.

The withdrawing pipe 42 is in a state sealed (material sealing) with the perfluoropolymer 2 so that the fluorine gas in the fluorination tank 13 would not to leak into the twin screw extruder 41 through the withdrawing pipe 42.

The die 43 is one for forming the perfluoropolymer 2 extruded from the twin screw extruder 41 into a strand 5.

The pelletizer 44 is one for cutting the strand 5 to prepare pellets of a perfluoropolymer.

Process for Producing Perfluoropolymer

The production of a perfluoropolymer, by using the apparatus 40 for producing a perfluoropolymer, is carried out as follows:

(i) to (iv) are carried out in the same manner as in First Embodiment.

(v) In a state where the withdrawing pipe 42 is sufficiently sealed by material sealing with the perfluoropolymer 2, operation of the twin screw extruder 41 is started, and the perfluoropolymer 2 is introduced into the twin screw extruder 41.

(vi) While the perfluoropolymer 2 is melted in the twin screw extruder 41, fluorine gas remained in the perfluoropolymer 2 is removed.

(vii) The perfluoropolymer 2 extruded from the twin screw extruder 41 is passed through the die 43 to prepare the strand 5.

(viii) The strand 5 is cut by the pelletizer 44 to obtain pellets of the perfluoropolymer.

As shown in FIG. 3, the steps (ii) to (viii) are continuously carried out by the apparatus 40 for producing a perfluoropolymer, having the extruder 11, the die 12, the fluorination tank 13, the withdrawing pipe 42, the twin screw extruder 41 and the pelletizer 44 integrally connected in series for carrying out the respective steps.

The melting temperature (the temperature of the twin screw extruder 41) of the perfluoropolymer 2 may be the same as the melting temperature of the polymer in the extruder 11.

Use

A perfluoropolymer obtained by the process for producing a perfluoropolymer of the present invention is used for coating of e.g. a chemical plant or a semiconductor production apparatus; covering of a cable or an optical fiber; automobile components, or the like.

Especially, a perfluoropolymer having —$SO_2F$ groups converted to —$SO_3H$ groups by subjecting the perfluoropolymer having —$SO_2F$ groups to hydrolysis treatment and treatment for acidification, is useful as an electrolyte polymer constituting an electrolyte membrane for polymer electrolyte fuel cells or an electrolyte polymer contained in an anode and a cathode for the fuel cells.

Now, the process for producing an electrolyte membrane for polymer electrolyte fuel cells will be described as follows.

The electrolyte membrane for polymer electrolyte fuel cells is produced by (i) a method comprising forming a film from a perfluoropolymer having —$SO_2F$ groups, obtained by the process for producing a perfluoropolymer of the present invention, and subjecting the film to hydrolysis treatment and treatment for acidification, or (ii) a method comprising subjecting a perfluoropolymer having —$SO_2F$ groups obtained by the process for producing a perfluoropolymer of the present invention, to hydrolysis treatment and treatment for acidification, and forming a treated perfluoropolymer into a film.

As the method for forming a perfluoropolymer into a film, an extrusion method or a cast method may, for example, be mentioned.

The hydrolysis treatment may, for example, be carried out by bringing a perfluoropolymer having —$SO_2F$ groups or a film thereof into contact with an alkaline aqueous solution. The alkaline aqueous solution may, for example, be an aqueous potassium hydroxide or an aqueous sodium hydroxide. The alkaline aqueous solution may contain an alcohol such as methanol.

The treatment for acidification may, for example, be carried out by bringing the perfluoropolymer or a film thereof subjected to hydrolysis treatment into contact with an acidic solution. The acidic solution may, for example, be sulfuric acid, nitric acid or hydrochloric acid. After the treatment for acidification, it is preferred to wash the perfluoropolymer or the film thereof with water.

In the case of using the polymer as an electrolyte membrane for polymer electrolyte fuel cells, the concentration of —$SO_3H$ groups, namely, the ion exchange capacity is preferably from 0.5 to 2.0 meq/g dry resin, particularly preferably from 0.7 to 1.6 meq/g dry resin. When the ion exchange capacity is at least 0.5 meq/g dry resin, it is possible to obtain an electrolyte membrane having low resistance. When the ion exchange capacity is at most 2.0 meq/g dry resin, it is possible to obtain an electrolyte membrane having high mechanical strength.

The durability of the perfluoropolymer having —$SO_3H$ groups or the film thereof may be evaluated by an immersion test using a fenton reagent. The test is carried out by immersing the polymer in a fenton reagent containing hydrogen peroxide and bivalent iron ions, and measuring fluorine ions eluted to a fenton reagent by polymer decomposition. The conditions of the immersion test using a fenton reagent are usually such that the concentration of hydrogen peroxide is from 1 to 30 mass %, the concentration of the bivalent iron ions is from 10 to 500 ppm, the immersion temperature is from 25 to 90° C., and the immersion time is from 0.5 to 24 hours. Since the terminal groups of the perfluoropolymer obtainable by the present invention are stable, the amount of ions eluted is low. Accordingly, in the case of using the polymer as an electrolyte membrane for polymer electrolyte fuel cells, it is possible to provide a polymer electrolyte fuel cell excellent in the durability.

In the case of the process for producing a perfluoropolymer of the present invention as described above, a polymer obtained by polymerizing a perfluoromonomer is extruded to prepare strands, and the strands are brought into contact with gas containing fluorine gas, whereby it is possible to carry out fluorination treatment in a short period of time, as compared with a conventional process in which a sheet is brought into contact with gas containing fluorine gas. Further, since it is possible to supply strands continuously, it is possible to continuously carry out fluorination treatment. As a result, it is possible to efficiently produce a perfluoropolymer having unstable terminal groups reduced. Further, when the perfluoropolymer having unstable terminal groups reduced by the fluorination treatment is continuously taken out from the fluorination tank, it is possible to more efficiently produce the perfluoropolymer having unstable terminal groups reduced.

Further, in the process for producing a perfluoropolymer of the present invention, the polymer obtained by polymerizing a perfluoromonomer is extruded to prepare strands, followed by contacting the strands with the gas containing fluorine gas, whereby no mechanical sliding portion is required when the strands are brought into contact with gas containing fluorine gas. Namely, such a process has an effect of suppressing contaminants otherwise produced from materials for a reactor due to mechanical sliding in a corrosive environment.

Further, in the process for producing an electrolyte membrane for polymer electrolyte fuel cells of the present invention, it is possible to efficiently produce an electrolyte membrane for polymer electrolyte fuel cells excellent in the durability since a perfluoropolymer having —$SO_2F$ groups obtained by the process for producing a perfluoropolymer of the present invention is used.

EXAMPLES

Now, the present invention will be described in detail with reference to Examples, but it should be understood that the present invention is not limited to such specific Examples.

Examples 1, 2 and 5 to 9 are Examples of the present invention, and Examples 3 and 4 are Comparative Examples.
TQ Value The extrusion amount of the polymer was measured by changing the temperature by means of Flow Tester CFT-500A (manufactured by Shimadzu Corporation), and a TQ value at which the extrusion amount becomes 100 $mm^3$/sec, was obtained.

Examples 1

A powder made of a copolymer (A-1) of tetrafluoroethylene and $CF_2$=$CFOCF_2CF(CF_3)O(CF_2)_2SO_2F$ was prepared. The ion exchange capacity of a perfluoropolymer having —$SO_3H$ groups, obtained by subjecting the copolymer (A-1) to hydrolysis treatment and treatment for acidification as mentioned below, was 1.1 meq/g dry resin. TQ of the copolymer (A-1) was 220° C.

As the apparatus for producing a perfluoropolymer, one having a construction as shown in FIG. 1 was used.

The copolymer (A-1) was melted at 230° C. by a single screw extruder (manufactured by Randcastle Extrusion Systems Inc., 12.7 mm in diameter) and extruded into a die at an extrusion rate of 2.7 g/min. The temperature at the connecting portion between the single screw extruder and the fluorination tank was 200° C. A molten polymer A extruded was passed through three pores (3 mm in diameter) in the die to obtain strands. While the strands were permitted to descend in the fluorination tank with a volume of 15 L, the strands were brought into contact with gas containing fluorine gas. In the fluorination tank, the temperature was 190° C. and the pressure was 0.2 MPa. To the fluorination tank, a mixed gas of a 7.5 vol % fluorine gas and a 92.5 vol % nitrogen gas was continuously supplied at 300 mL/min, and the gas in the fluorination tank was discharged so that the pressure in the fluorination tank would be constant. The strand diameter was 0.3 mm in diameter at the lowermost end of the strand.

After the copolymer (A-1) was supplied to a fluorination tank for 30 minutes, the gas in the fluorination tank was withdrawn, and the gas in the fluorination tank was replaced with nitrogen gas. After the temperature in the fluorination tank was lowered to room temperature, the perfluoropolymer pooled in the bottom of the fluorination tank was taken out.

The perfluoropolymer was immersed in an alkaline aqueous solution containing a 20 mass % methanol and a 10 mass % potassium hydroxide, followed by hydrolysis treatment. Then, the perfluoropolymer was washed with sulfuric acid to carry out treatment for acidification, and further washed with deionized water to obtain a perfluoropolymer having —$SO_3H$ groups.

Immersion Test Using Fenton Reagent

The perfluoropolymer having —$SO_3H$ groups was kept in a globe box for 24 hours in an atmosphere of a nitrogen gas flow, and about 0.1 g of the polymer was weighed in the globe box. The perfluoropolymer having —$SO_3H$ groups was immersed at 40° C. for 16 hours in 50 g of a fenton reagent containing 3 mass % of hydrogen peroxide and 200 ppm of bivalent iron ions. After the polymer was removed, the mass of the fenton reagent was measured, the concentration of the fluorine ion in the fenton reagent was measured by an ion meter to calculate the elution amount of the fluorine ion. The elution amount of the fluorine ion was 0.0015%.

Example 2

A perfluoropolymer was obtained by fluorination treatment of the copolymer (A-1) in the same manner as in Example 1 except that the extrusion rate was changed to 5.6 g/min. The strand diameter was 0.6 mm in diameter at the thinnest portion.

The perfluoropolymer obtained was subjected to an immersion test using a fenton reagent in the same manner as in Example 1. The elution amount of the fluorine ion was 0.0068% based on the total fluorine amount in the polymer immersed.

Example 3

Comparative Example

With respect to the copolymer (A-1) which was not subjected to fluorination treatment, an immersion test using a fenton reagent was carried out in the same manner as in Example 1. The elution amount of the fluorine ion was 0.063% based on the total fluorine amount in the polymer immersed.

Example 4

Comparative Example

A 200 mL reactor made of nickel was prepared. 5 g of the copolymer (A-1) was charged into the reactor, the same mixed gas as in Example 1 was charged thereinto until the pressure would be 0.25 MPa, the interior was kept at 180° C. for 4 hours to carry out fluorination treatment to obtain a perfluoropolymer.

The perfluoropolymer obtained was subjected to an immersion test using a fenton reagent in the same manner as in Example 1. The elution amount of the fluorine ion was 0.005% based on the total fluorine amount in the polymer immersed.

Example 5

A perfluoropolymer was obtained by the fluorination treatment of the copolymer (A-1) in the same manner as in Example 1 except that the mixed gas was charged into the fluorination tank so as to be 0.2 MPa before the fluorination treatment was started, and no mixed gas was additionally supplied thereto.

The perfluoropolymer obtained was subjected to an immersion test using a fenton reagent in the same manner as in Example 1. The elution amount of the fluorine ion was 0.0006% based on the total fluorine amount in the polymer immersed.

Example 6

A perfluoropolymer was obtained by the fluorination treatment of the copolymer (A-1) in the same manner as in Example 1 except that the mixed gas was charged into the fluorination tank so as to be 0.1 MPa before the fluorination treatment was started, and no mixed gas was additionally supplied thereto.

The perfluoropolymer obtained was subjected to an immersion test using a fenton reagent in the same manner as in Example 1. The elution amount of the fluorine ion was 0.0069% based on the total fluorine amount in the polymer immersed.

Example 7

A perfluoropolymer was obtained by the fluorination treatment of the copolymer (A-1) in the same manner as in Example 1 except that the mixed gas was charged to the fluorination tank so as to be 0.01 MPa before the fluorination treatment was started, and no mixed gas was additionally supplied thereto.

The perfluoropolymer obtained was subjected to an immersion test using a fenton reagent in the same manner as in Example 1. The elution amount of the fluorine ion was 0.0045% based on the total fluorine amount in the polymer immersed.

Example 8

A perfluoropolymer was obtained by the fluorination treatment of the copolymer (A-1) in the same manner as in Example 1 except that the fluorination treatment was carried out while the perfluoropolymer pooled at the bottom of the fluorination tank was continuously taken out by using, as the apparatus for producing a perfluoropolymer, one having a construction as shown in FIG. 3, and the pressure in the fluorination tank was adjusted to 0.3 MPa.

The perfluoropolymer obtained was subjected to an immersion test using a fenton reagent in the same manner as in Example 1. The elution amount of the fluorine ion was the detection limit or below.

Example 9

The perfluoropolymer taken out from the fluorination tank, obtained in Example 1, was formed into a film with a thickness of about 30 μm by press molding. The film obtained was subjected to hydrolysis treatment and treatment for acidification to convert —$SO_2F$ groups to —$SO_3H$ groups. Such a film was an excellent film having no cracks or the like.

A perfluoropolymer having —$SO_2F$ groups, obtained by the process for producing a perfluoropolymer of the present invention, is particularly useful as a starting material for an electrolyte membrane for polymer electrolyte fuel cells excellent in the durability since unstable terminal groups of the polymer are reduced.

The entire disclosures of Japanese Patent Application No. 2007-130350 filed on May 16, 2007, Japanese Patent Application No. 2006-288661 filed on Oct. 24, 2006 and Japanese Patent Application No. 2005-311170 filed on Oct. 26, 2005 including specifications, claims, drawings and summaries are incorporated herein by reference in their entireties.

What is claimed is:

1. A process for producing a perfluoropolymer with reduced chain terminal unstable functional groups, which comprises extruding a polymer comprising chain terminal unstable functional groups, obtained by polymerizing a perfluoromonomer, to prepare polymer strands comprising chain terminal unstable functional groups, and reducing the polymer strands chain terminal unstable functional groups by bringing a gas comprising from 3 to 50 volume % of fluorine gas into contact with the polymer strands in a molten state such that fluorine gas is absorbed and diffused into the polymer strands and is reacted with chain terminal unstable terminal groups throughout the polymer strands, thereby reducing the chain terminal unstable functional groups throughout the polymer strands.

2. The process for producing a perfluoropolymer according to claim 1, wherein the gas is brought into contact with the polymer strands at a temperature of from 150 to 350° C.

3. The process for producing a perfluoropolymer according to claim 1, wherein the polymer has —$SO_2F$ groups.

4. The process for producing a perfluoropolymer according to claim 3, wherein the polymer is a copolymer of tetrafluoroethylene and a compound represented by the following formula (I):

$$CF_2\!\!=\!\!CF(OCF_2CFX)_p(O)_q(CF_2)_nSO_2F \quad (1)$$

wherein X is a fluorine atom or a trifluoromethyl group, p is an integer of from 0 to 8, q is 0 or 1, n is an integer of from 0 to 8, and p+n>0.

5. The process of claim 4, wherein the compound of formula (1) is a compound having the formula (I-1):

$$CF_2\!\!=\!\!CFO(CF_2)_rSO_2F \quad (1\text{-}1),$$

wherein r is an integer ranging from 1 to 9.

6. The process of claim 5, wherein r is 1.

7. The process of claim 5, wherein r is 2.

8. The process of claim 4, wherein the compound of formula (I) is a compound having the formula (I-2):

$$CF_2\!\!=\!\!CFOCF_2CF(CF_3)O(CF_2)_5SO_2F \quad (1\text{-}2),$$

wherein s is an integer ranging from 1 to 8.

9. The process of claim 4, wherein the compound of formula (1) is a compound of formula (I-3):

$$CF_2\!\!=\!\!CF(CF_2)_tSO_2F \quad (1\text{-}3),$$

wherein t is an integer ranging from 0 to 8.

10. The process of claim 4, wherein the compound of formula (1) is a compound of formula (I-4):

$$CF_2\!\!=\!\!CF[OCF_2CF(CF_3)]_zO(CF_2)_2SO_2F \quad (1\text{-}4),$$

wherein z is 2 or 3.

11. The process for producing a perfluoropolymer according to claim 3, wherein the gas is brought into contact with the polymer strands at a temperature of from 150 to 350° C.

12. The process for producing a perfluoropolymer according to claim 11, wherein the polymer is a copolymer of tetrafluoroethylene and a compound represented by the following formula (1):

$$CF_2\!\!=\!\!CF(OCF_2CFX)_p(O)_q(CF_2)_nSO_2F \quad (1)$$

wherein X is a fluorine atom or a trifluoromethyl group, p is an integer of from 0 to 8, q is 0 or 1, n is an integer of from 0 to 8, and p+n>0.

13. The process of claim 1, wherein the chain terminal unstable functional groups comprise —COOH groups.

14. The process of claim 1, wherein the chain terminal unstable functional groups comprise —CF=$CF_2$ groups.

15. The process of claim 1, wherein the chain terminal unstable functional groups comprise —COF groups.

16. The process of claim 1, wherein the chain terminal unstable functional groups comprise —$CF_2H$ groups.

17. The process of claim 1, wherein the diameter of the pores in the die is from 0.5 to 5 mm.

18. The process of claim 1, wherein the diameter of the pores in the die is from 1 to 3 mm.

19. The process of claim 1, wherein the polymer strands are supplied to the fluorination tank continuously and the contacting of the polymer strands with the fluorine-containing gas is carried out continuously.

20. The process according to claim 1, wherein said process is conducted in an apparatus comprising an extruder for melting and extruding the polymer obtained by polymerizing the perfluoromonomer, a die having a plurality of pores for preparing the polymer strands from the molten polymer extruded, and a fluorination tank for bringing the gas comprising from 3 to 50 volume % of fluorine gas into contact with the polymer strands.

* * * * *